United States Patent [19]

Reif et al.

[11] 4,043,938

[45] Aug. 23, 1977

[54] METHODS FOR REACTIVATING ZEOLITES

[75] Inventors: Hans-Heinrich Reif; Klaus Wehner, both of Leuna; Jürgen Welker, Halle-Neustadt; Karl-Heinz Schmidt, Leuna; Waltraud Schnick; Lutz Widmann, both of Halle-Neustadt; Otto Schicker, Merseburg-Sud; Gunter Seidel, Leuna; Karsten Kalb, Weissenfels; Wolfhard Dollase, Bad Durrenberg; Helmut Fürtig, Jessnitz; Werner Höse, Dresden; Wolfgang Roscher, Halle; Udo Hädicke; Herbert Knoll, both of Dessau; Rüdiger Seidel, Sandersdorf; Gunter Nemitz, Wolfen; Edith Stürmer, Bad Durrenberg; Manfred Kaiser, Berlin-Karlshorst, all of Germany

[73] Assignee: VEB Leuna-Werke "Walter Ulbricht", Leuna, Germany

[21] Appl. No.: 546,244

[22] Filed: Feb. 3, 1975

[30] Foreign Application Priority Data

June 24, 1974 Germany ............................ 179392
June 24, 1974 Germany ............................ 179393

[51] Int. Cl.² .................... B01J 29/38; C10G 25/12; C07C 7/12
[52] U.S. Cl. ........................................ 252/412; 55/75; 208/310 Z; 252/411 R; 252/420; 260/676 MS
[58] Field of Search ............... 252/420, 412, 416, 411; 208/310 Z; 260/676 MS; 55/75

[56] References Cited

U.S. PATENT DOCUMENTS

| 3,075,023 | 1/1963 | Garrison et al. ............. 260/676 MS |
| 3,347,783 | 10/1967 | Feldbauer, Jr. .................. 208/310 Z |
| 3,405,057 | 10/1968 | Neuzil et al. ..................... 208/310 Z |
| 3,420,772 | 1/1969 | Eck ........................................ 252/420 |
| 3,422,004 | 1/1969 | Padrta .................................. 252/420 |
| 3,437,601 | 4/1969 | Skala et al. ........................... 252/420 |
| 3,531,400 | 9/1970 | Wehner et al. .................. 208/310 Z |
| 3,622,506 | 11/1971 | De Rosset ........................... 252/420 |
| 3,836,455 | 9/1974 | Blytas ............................ 260/676 MS |

*Primary Examiner*—Winston A. Douglas
*Assistant Examiner*—P. E. Konopka
*Attorney, Agent, or Firm*—Nolte and Nolte

[57] ABSTRACT

A zeolite of type 5A, which has been used to separate normal paraffins from a hydrocarbon mixture containing normal paraffins by bringing the hydrocarbon mixture into contact with the zeolite whereby the zeolite absorbs the normal paraffins and then desorbing the normal paraffins from the zeolite by contacting the zeolite with water-containing ammonia vapour, is reactivated by first contacting the zeolite with at least one of water, aqueous solutions and water-containing gases at a temperature below 350° C and then heating the zeolite to a temperature above 350° C.

16 Claims, No Drawings

METHODS FOR REACTIVATING ZEOLITES

The invention relates to a method for reactivating zeolites. It relates, in particular, to a method for reactivating zeolites of type 5A, which are used to separate normal paraffins from hydrocarbon mixtures containing these paraffins by alternating adsorption and desorption, the desorption being effected with water-containing ammonia vapour.

Zeolites, like all other solids which are used for the treatment of hydrocarbons or hydrocarbon mixtures, suffer a loss of activity in the course of the treatment. In order to ensure a technically and aconomically justifiable output of the zeolites for long operating periods, reactivation is therefore necessary from time to time.

A known procedure for reactivating zeolites is based on their treatment with oxygen or oxygen-containing gases at temperatures above 500° C. However, zeolites of type 5A, which are used to separate normal paraffins from hydrocarbon mixtures containing these paraffins by alternating adsorption and desorption, do not regain by this treatment their original adsorption capacity for the normal paraffins. This is particularly the case when the desorption is effected with water-containing ammonia vapour or the adsorption is effected in the presence of water. Frequently, lost adsorption capacity cannot even be partly recovered by such a procedure.

It is furthermore known (German Democratic Republic Patent No. 78,228) to treat the deactivated zeolites with hydrogen or hydrogen-containing gases before treatment with oxygen-containing gases at 200° to 700° C. Zeolites which are used to separate normal paraffins from hydrocarbon mixtures containing the latter by alternating adsorption and desorption, where the desorption is effected with water-containing ammonia vapour, do not regain by this treatment the full adsorption capacity of fresh zeolites.

The prior art methods have the disadvantage that they permit only a partial recovery of the original separating power of zeolites. In particular, they are not capable of fully reactivating zeolites which were brought into contact with steam or a mixture of ammonia and water during the adsorption, rinsing phase and/or the desorption.

An object of the invention is to practically fully reactivate zeolites which are used to separate hydrocarbon mixtures by adsorption followed by desorption with water-containing ammonia vapour, with rinsing interposed, if necessary, at an economically justifiable cost.

Other objects and advantages of the invention will be apparent from the following description of the invention.

According to the invention, there is provided a method for reactivating zeolites, particularly of the type 5A, which are used to separate normal paraffins from hydrocarbon mixtures containing the latter by adsorption and desorption, where the desorption is effected with water containing ammonia vapour, by treating the zeolites in a first phase with water, aqueous solutions or water-containing gases at temperatures below 350° C., and in a second phase, preferably in the presence of flowing gases, at tempertures above 350° C and exposing them, if necessary, before or after this treatment to oxygen or oxygen-containing gases at temperatures of 450° to 650° C.

Frequently, the additional treatment of the zeolites with oxygen or oxygen-containing gases is not necessary. This applies particularly to those cases in which normal paraffins below hexadecane are adsorbed from hydrocarbon mixtures and subsequently desorbed with water containing ammonia vapour.

From an economical viewpoint, it may be particularly advantageous that the second phase be coupled with the action of oxygen-containing gases and that air, for example, be used in this phase as a flowing gas.

Particularly effective is the treatment of the zeolites in a first phase with water or water-containing gases at temperatures between 20° and 250° C. and in a second phase in the presence of flowing gases at temperatures between 400° and 550° C. Furthermore, it is advisable that at least 0.1 kg. water per kg. zeolite be used in this first treatment phase. The amount of water and treatment temperature are somewhat dependent on each other, but this dependence is practically no longer observed above 10 kg. water per kg. zeolite. It is furthermore of advantage that in the second phase the flowing gases have a water content less than 5% by volume.

The presence of flowing gases is not necessary in the second phase, and it is possible to operate instead at subatmospheric pressure. But, working with flowing gases in this phase frequently offers technological advantages. It is preferred that the flowing gases be at least one of air, oxygen, hydrogen, nitrogen or ammonia. As mentioned before, the use of oxygen or an oxygen-containing gas mixture, such as air, may be particularly advantageous.

An advantageous procedure for reactivating zeolites of type 5A, which are used for separating normal paraffins from hydrocarbon mixtures containing normal paraffins by alternating adsorption and desorption, where the desorption is effected with water containing ammonia vapour, consists in effecting the treatment of the zeolites both in the first and in the second phase with gaseous ammonia containing water in an amount up to 0.5% by volume.

Another advantageous procedure consists in treating the zeolites to be reactivated in a first phase at temperatures below 100° C. with an aqueous solution of at least one bivalent metal salt, particularly of metals of group IIa of the periodic system, subsequently washing them with water, drying them, and treating them in a second phase at temperatures above 350° C., if necessary in an oxygen-containing atmosphere. It is advantageous to effect the treatment of the zeolites with the aqueous salt solution at temperatures of from 20° to 70° C. The preferred salts are magnesium sulfate, magnesium chloride, magnesium acetate, calcium sulfate, calcium chloride and calcium acetate. It is advantageous to use the salts in amounts of 0.1 to 1 mole per mole of zeolite. Furthermore, it is advisable to treat the zeolites for 1 to 72 hours with the aqueous salt solution.

Another advantageous embodiment of the method according to the invention consists in treating the zeolite to be reactivated first at temperatures below 150° C. with an aqueous solution of at least one nitrogen compound containing at least one C-N grouping and subsequently at temperatures above 400° C. and pressures below 1 atmosphere, particularly below 0.1 atmosphere, or in the presence of flowing gases at pressures not exceeding 15 atmospheres. It is particularly effective if the zeolites are completely surrounded by the aqueous solution. If it is not possible for technological reasons to operate above atmospheric pressure, it is advisable that the temperature in the first stage be below 100° C. It is advantageous that the nitrogen compounds used in the first stage be selected from among urea and nitrogen compounds of the $NR_1R_2R_3$, in which $R_1$ and $R_2$ is each H or $CH_3$ or $C_2H_5$ and $R_3$ is $CH_3$ or $C_2H_5$. As mentioned before, it is advisable that the flowing gases in the second stage be at least one of nitrogen, hydrogen, ammonia, oxygen and air. If water-containing gas is used in the first stage, it is preferred that the gas also be at least one of nitrogen, hydrogen, ammonia, oxygen and air.

It is again noted that the invention is particularly effective for the reactivation of zeolitic molecular sieves which have a pore diameter of 5 angstroms and have been used to separate normal paraffins from hydrocarbon mixtures containing normal paraffins.

The following examples will serve to further illustrate the method of the invention.

EXAMPLE 1

An adsorption column having an inside diameter of 21 mm. and a length of 600 mm. is filled with 200 ml. of a zeolite of the type 5AM having a particle size range of 1.2 to 2 mm., which has a 2.4% by weight, based on the weight of the zeolite, adsorption capacity for n-paraffins of a chain length $C_{10}$ to $C_{18}$ after having been used for a period of time for the separation of such n-paraffins from a hydrocarbon mixture containing the n-paraffins. In a first phase, water of a temperature of 25° C. is conducted upwardly through the zeolite layer at a rate of 1 g. per hour per g. of zeolite. The water treatment takes 8 hours. Subsequently, the water contained in the adsorption column is drained and the zeolite layer is treated in a second phase with hydrogen having a water content of 0.01% by volume and at a temperature of 450° C. After this treatment, the adsorption capacity of this zeolite for n-paraffins of chain length $C_{10}$ to $C_{18}$ is found to have increased to 4.7% by weight, based on the weight of the zeolite.

EXAMPLE 2

With the use of a spent zeolite and apparatus as in Example 1, water together with hydrogen are conducted in a first phase at a temperature of 90° C, downwardly through the zeolite layer at the rate of 0.5 g. of water per hour per g. of zeolite and 400 parts by volume of hydrogen per hour per part by volume zeolite, and this treatment is continued over a period of 16 hours. In the second phase, the zeolite layer is traversed by hydrogen at a temperature of 500° C., having a water content of 0.01% by volume. After this treatment, the adsorption capacity of the zeolite for n-paraffins of chain length $C_{10}$ to $C_{18}$ is found to have increased to 5.0% by weight.

EXAMPLE 3

With the use of a spent zeolite and apparatus as in Example 1, hydrogen having a water content of 25% by volume is conducted downwardly through the zeolite layer in the first phase at a temperature of 160° C. and a rate of 400 volumes of hydrogen per hour per volume of the zeolite and 0.15 g. of water per hour per g. of the zeolite, and this treatment is continued for 30 hours. In a second phase, the zeolite layer is traversed by air at a temperature of 550° C., and a rate of 50 volumes of the air per hour per volume of the zeolite. After this treatment, the adsorption capacity of the zeolite for n-paraffins of chain length $C_{10}$ to $C_{18}$ is found to have increased to 5.4% by weight.

EXAMPLE 4

With the use of a spent zeolite and apparatus as in Example 1, ammonia having a water content of 20% by volume is conducted in the first phase at a temperature of 95° C. downwardly through the zeolite layer at a rate of 1000 volumes of ammonia per hour per volume of the zeolite and 0.5 g. of water per hour per g. of the zeolite. This treatment lasts 16 hours. In a second phase, the zeolite layer is traversed by ammonia at a temperature of 500° C. and having a water content of 0.5% by volume. After this treatment, the adsorption capacity of the zeolite for n-paraffins of chain length $C_{10}$ to $C_{18}$ is found to have increased to 4.9% by weight.

EXAMPLE 5

A spent zeolite of type 5AM is treated with an aqueous magnesium chloride solution (0.5 mole magnesium chloride/mole zeolite) at 25° C. for 48 hours. Subsequently, the zeolite is washed with water, dried and heated in an air current having a temperature of 450° C. Due to this treatment, the capacity of the zeolite for n-paraffins of chain length $C_{10}$ to $C_{18}$ increases, as can be seen from the following table:

| Zeolite | Capacity |
| --- | --- |
| untreated | 1.2 % |
| treated | 5.1 % |
| original | 5.2 % |

EXAMPLE 6

A spent zeolite of the type 5AM is treated for 8 hours with an aqueous magnesium sulfate solution (0.2 mole magnesium sulfate/mole zeolite) at 60° C. Subsequently, the zeolite is washed with water, dried and heated in an air current having a temperature of 450° C. Due to this treatment, the capacity of the zeolite for n-paraffins of chain length $C_{10}$ to $C_{18}$ increases, as can be seen from the following table:

| Zeolite | Capacity |
| --- | --- |
| untreated | 1.2 % |
| treated | 5.0 % |
| original | 5.2 % |

EXAMPLE 7

An adsorption column having an inside diameter of 21 mm. and a length of 600 mm. is filled with 200 ml. of a spent zeolite of type 5AM having a grain size range of 1.2 to 2 mm. and an adsorption capacity for n-paraffins of chain length $C_{10}$ to $C_{18}$ of 2.4% by weight. In a first phase, an aqueous urea solution containing 10%, by weight, of urea is conducted upwardly through the zeolite layer at a temperature of 25° C. and a rate of 1.0 g. of the solution per hour per g. of the zeolite, and the treatment of completed after 8 hours. Subsequently the urea solution still contained in the adsorption column is drained off, and the zeolite layer is traversed in a second phase by hydrogen at a temperature of 450° C. After this treatment, the adsorption capacity of the zeolite for n-paraffins of chain length $C_{10}$ to $C_{18}$ is found to have increased to 5.0% by weight.

EXAMPLE 8

With the use of a spent zeolite and apparatus as in Example 7, an aqueous ethylamine solution containing 20%, by weight, of ethylamine is conducted in the first phase at a temperature of 85° C. through the zeolite layer. This treatment lasts 21 hours at the rate of 0.5 g. of the solution per hour per g. of the zeolite. In the second phase, the zeolite layer is treated by being heated at a temperature of 400° C. at a pressure of 20 torr. After this treatment, the adsorption capacity of the zeolite for n-paraffins of a chain length of $C_{10}$ to $C_{18}$ is found to have increased to 4.8% by weight.

EXAMPLE 9

With the use of a spent zeolite and apparatus as in Example 7, an aqueous dimethylamine solution containing 15% by weight, of dimethylamine is conducted in the first phase at a temperature of 40° C. through the zeolite layer. The treatment at the rate of 2 g. of the solution per hour per g. of the zeolite lasts 8 hours. In the second phase, the zeolite layer is traversed by air at a temperature of 500° C. and a rate of 20 volumes of the air per hour per volume of the zeolite. The process takes 6 hours. Due to this treatment, the adsorption capacity of the zeolite for n-paraffins of chain length $C_{10}$ to $C_{18}$ increases to 5.2% by weight.

EXAMPLE 10

With the use of a spent zeolite and apparatus as in Example 7, an aqueous dimethylamine solution containing 10% by weight, of dimethylamine is conducted upwardly through the zeolite layer in the first phase at a temperature of 25° C. The treatment lasts 6 hours at a rate of 0.75 g. of the solution per hour per g. of the zeolite. In the second phase, the zeolite layer is traversed by ammonia at the rate of 400 volumes of ammonia per hour per volume of zeolite and at a temperature of 450° C. After the second phase, the adsorption capacity of the zeolite for n-paraffins of chain length $C_{10}$ to $C_{18}$ has increased to 4.9% by weight.

What is claimed is:

1. A method for reactivating a zeolite whose absorptive capacity has been deactivated in a process of separating normal paraffins from a hydrocarbon mixture containing said paraffins by means of alternating adsorption onto said zeolite and desorption therefrom with water-containing ammonia vapor; which method comprises a first step of contacting said zeolite directly after said desorption step with water, or water-containing gases at a temperature of about 20°–250° C, the proportion by weight of water to zeolite being at least 1:10, and then contacting said zeolite in a second step with a stream of gas selected from the group consisting of air, hydrogen, oxygen, nitrogen and ammonia, at a temperature of about 400°–550° C, said gas having a water content of less than 5% by volume, until said zeolite is restored to substantially its original adsorption capacity.

2. A method in accordance with claim 1, wherein the stream of gas used in the second step has a maximum water content of 0.5% by volume.

3. A method in accordance with claim 1, wherein the stream of gas in the second step is an oxygen-containing gas.

4. A method in accordance with claim 1, wherein water is used in the first step and a stream of hydrogen containing less than 0.01% water by volume is used in the second step.

5. A method in accordance with claim 1, wherein hydrogen having a water of content of 25% by volume is used in the first step and a stream of air is used in the second step.

6. A method in accordance with claim 1, wherein ammonia having a water content of 20% by volume is used in the first step and a stream of ammonia having a water content of 0.5% by volume is used in the second step.

7. A method for reactivating a zeolite whose absorptive capacity has been deactivated in a process of separating normal paraffins from a hydrocarbon mixture containing said paraffins by means of alternating adsorption onto said zeolite and desorption therefrom with water-containing ammonia vapor; which method comprises a first step of contacting said zeolite directly after said desorption step with an aqueous solution of a salt of the bivalent metal of group IIA of the periodic system at a temperature below about 100° C, for a period of 1 to 72 hours, the amount of salt used being 0.1 to 1.0 mole per mole of zeolite; and then contacting said zeolite in a second step with a stream of gas selected from the group consisting of air, hydrogen, oxygen, nitrogen and ammonia, at a temperature of about 400°–550° C, said gas having a water content of less than 5% by volume, until said zeolite is restored to substantially its original adsorption capacity.

8. A method in accordance with claim 7, wherein the aqueous solution of the bivalent metal salt is selected from the class consisting of magnesium sulfate, magnesium chloride, magnesium acetate, calcium sulfate, calcium chloride and calcium acetate.

9. A method in accordance with claim 7, wherein the salt treated zeolite is washed with water and dried prior to said second step of contacting with a stream of gas.

10. A method for reactivating a zeolite whose absorptive capacity has been deactivated in a process of separating normal paraffins from a hydrocarbon mixture containing said paraffins by means of alternating adsorption onto said zeolite and desorption therefrom with water-containing ammonia vapor; which method comprises a first step of contacting said zeolite directly after said desorption step with an aqueous solution of a substance selected from the class consisting of urea and a nitrogen compound having the formula $NR_1 R_2R_3$, wherein $R_1$ and $R_2$ are independently H, $CH_3$ or $C_2H_5$ and $R_3$ is $CH_3$ or $C_2H_5$, at a temperature below about 150° C, for a period of 1 to 72 hours, and then contacting said zeolite in a second step with a stream of gas selected from the group consisting of air, hydrogen, oxygen, nitrogen and ammonia, at a temperature of about 400°–550° C, said gas having a water content of less than 5% by volume, until said zeolite is restored to substantially its original adsorption capacity.

11. A method in accordance with claim 10, wherein the second step is conducted below about one atmosphere pressure.

12. A method in accordance with claim 10, wherein the second step is conducted below about 0.1 atmosphere pressure.

13. A method in accordance with claim 10, wherein an aqueous urea solution is used in the first step and a stream of hydrogen gas is used in the second step.

14. A method in accordance with claim 10, wherein the second step is conducted in the presence of a stream of gas at a maximum pressure of 15 atmospheres.

15. A method in accordance with claim 10, wherein an aqueous dimethyl amine solution is used in the first step, and a stream of air is used in the second step.

16. A method in accordance with claim 10, wherein aqueous dimethylamine is used in the first step and a stream of ammonia is used in the second step.

* * * * *